US010490200B2

(12) United States Patent
Furse

(10) Patent No.: US 10,490,200 B2
(45) Date of Patent: Nov. 26, 2019

(54) SOUND SYSTEM

(71) Applicant: Richard Furse, London (GB)

(72) Inventor: Richard Furse, London (GB)

(73) Assignee: Richard Furse, London (GB)

( * ) Notice: Subject to any disclaimer, the term of this patent is extended or adjusted under 35 U.S.C. 154(b) by 113 days.

(21) Appl. No.: 15/689,814

(22) Filed: Aug. 29, 2017

(65) Prior Publication Data

US 2017/0358308 A1 Dec. 14, 2017

Related U.S. Application Data

(63) Continuation of application No. 14/728,565, filed on Jun. 2, 2015, now Pat. No. 9,773,506, which is a (Continued)

(30) Foreign Application Priority Data

Feb. 4, 2009 (GB) .................................. 0901722.9

(51) Int. Cl.
*G06F 17/00* (2019.01)
*G10L 19/02* (2013.01)
(Continued)

(52) U.S. Cl.
CPC ............ *G10L 19/0212* (2013.01); *H04S 3/00* (2013.01); *H04S 7/00* (2013.01); *H04S 7/30* (2013.01);
(Continued)

(58) Field of Classification Search
CPC ......... G10L 19/0212; H04S 3/00; H04S 7/00; H04S 7/30; H04S 2420/01; H04S 2420/11
See application file for complete search history.

(56) References Cited

U.S. PATENT DOCUMENTS 5,757,927 A 5/1998 Gerzon et al.
5,957,998 A 9/1999 Ozaki
(Continued)

FOREIGN PATENT DOCUMENTS

CN 1402956 A 3/2003
CN 1735922 A 2/2006
(Continued)

OTHER PUBLICATIONS

Begault, Durand R., "3-D Sound for Virtual Reality and Multimedia," NASA/TM-2000-000000, Apr. 2000, Ames Research Center, Moffett Field, California.
(Continued)

*Primary Examiner* — Joseph Saunders, Jr.
(74) *Attorney, Agent, or Firm* — EIP US LLP

(57) ABSTRACT

Embodiments of the invention relate to methods and systems for processing audio data, such as spatial audio data. One or more sound characteristics of a given component of a spatial audio signal are modified in dependence on a relationship between a direction characteristic of the given component and a defined range of direction characteristics. In some embodiments, a spatial audio in a format using a spherical harmonic representation of sound components is decoded by performing a transform on the spherical harmonic representation, in which the transform is based on a predefined speaker layout and a predefined rule, the predefined rule indicating a speaker gain of each speaker arranged according to the predefined layout, when reproducing sound incident form a given direction. In some embodiments, a plurality of matrix transforms is combined into a combined transform, and the combined transform is performed on an audio signal.

23 Claims, 5 Drawing Sheets

Related U.S. Application Data continuation of application No. 13/192,717, filed on Jul. 28, 2011, now Pat. No. 9,078,076, which is a continuation of application No. PCT/EP2010/051390, filed on Feb. 4, 2010.

(51) Int. Cl.
*H04S 3/00* (2006.01)
*H04S 7/00* (2006.01)

(52) U.S. Cl.
CPC ....... *H04S 2420/01* (2013.01); *H04S 2420/11* (2013.01)

(56) References Cited

U.S. PATENT DOCUMENTS

| | | | |
|---|---|---|---|
| 6,259,795 B1 | 7/2001 | McGrath | |
| 6,628,787 B1 | 9/2003 | McGrath et al. | |
| 7,231,054 B1 | 6/2007 | Jot et al. | |
| 2003/0185417 A1 | 10/2003 | Alattar et al. | |
| 2004/0111171 A1 | 6/2004 | Jang et al. | |
| 2005/0069224 A1 | 3/2005 | Nowicki et al. | |
| 2005/0141728 A1 | 6/2005 | Moorer | |
| 2006/0045275 A1 | 3/2006 | Daniel | |
| 2006/0083394 A1* | 4/2006 | McGrath .................. | H04S 3/00 381/309 |
| 2008/0298610 A1 | 12/2008 | Virolainen et al. | |

FOREIGN PATENT DOCUMENTS

| | | | |
|---|---|---|---|
| CN | 1857031 | A | 11/2006 |
| EP | 1416769 | A1 | 5/2004 |
| FR | 2847376 | A1 | 5/2004 |
| GB | 2379147 | A | 2/2003 |
| WO | 9318630 | A1 | 9/1993 |
| WO | 0126422 | A2 | 4/2001 |
| WO | 0182651 | A1 | 11/2001 |
| WO | 2004049299 | A1 | 6/2004 |
| WO | 2005032213 | A1 | 4/2005 |
| WO | 2007045016 | A1 | 4/2007 |
| WO | 2008039339 | A2 | 4/2008 |

OTHER PUBLICATIONS

Pulkki, V., et al., "Localization of Virtual Sources in Multichannel Audio Reproduction" IEEE Transactions on Speech and Audio Processing, vol. 13, No. 1, Jan. 2005.

Gerzon, Michael, "Surround-Sound Psychoacoustics," Mathematical Institute, University of Oxford, Reproduced from Wireless World, Dec. 1974.

Wiki, "Transformation matrices," from DmWiki, Sep. 2, 2007. http://wiki.gamedev.net/index.php?title=Matrix_math&oldid=21089.

Wiki, "Matrix math," from GDWiki (Game Development Wiki), Feb. 24, 2008.

* cited by examiner

100

SOUND SYSTEM

CROSS-REFERENCE TO RELATED APPLICATIONS

This application is a continuation of U.S. application Ser. No. 14/728,565, filed Jun. 2, 2015, which is a continuation of U.S. application Ser. No. 13/192,717, filed Jul. 28, 2011, which is a continuation of International Application No. PCT/EP2010/051390, filed Feb. 4, 2010, which claims priority to United Kingdom Patent Application No. GB 0901722.9, filed Feb. 4, 2009. Each of the above-referenced patent applications is hereby incorporated by reference in its entirety.

BACKGROUND OF THE INVENTION

Field of the Invention

The present invention relates to a system and method for processing audio data. In particular, it relates to a system and method for processing spatial audio data.

Description of the Related Technology

In its simplest form, audio data takes the form of a single channel of data representing sound characteristics such as frequency and volume; this is known as a mono signal. Stereo audio data, which comprises two channels of audio data and therefore includes, to a limited extent, directional characteristics of the sound it represents has been a highly successful audio data format. Recently, audio formats, including surround sound formats, which may include more than two channels of audio data and which include directional characteristics in two or three dimensions of the sound represented, are increasingly popular.

The term "spatial audio data" is used herein to refer to any data which includes information relating to directional characteristics of the sound it represents. Spatial audio data can be represented in a variety of different formats, each of which has a defined number of audio channels, and requires a different interpretation in order to reproduce the sound represented. Examples of such formats include stereo, 5.1 surround sound and formats such as Ambisonic B-Format and Higher Order Ambisonic (HOA) formats, which use a spherical harmonic representation of the soundfield. In first-order B-Format, sound field information is encoded into four channels, typically labelled W, X, Y and Z, with the W channel representing an omnidirectional signal level and the X, Y and Z channels representing directional components in three dimensions. HOA formats use more channels, which may, for example, result in a larger sweet area (i.e. the area in which the user hears the sound substantially as intended) and more accurate soundfield reproduction at higher frequencies. Ambisonic data can be created from a live recording using a Soundfield microphone, mixed in a studio using ambisonic panpots, or generated by gaming software, for example.

Ambisonic formats, and some other formats use a spherical harmonic representation of the sound field. Spherical harmonics are the angular portion of a set of orthonormal solutions of Laplace's equation.

The Spherical Harmonics can be defined in a number of ways. A real-value form of the spherical harmonics can be defined as follows:

$$X_{l,m}(\theta,\phi)=\sqrt{\frac{(2l+1)(l-|m|)!}{2\pi(l+|m|)!}}\,P_l^{|m|}(\cos\theta)\begin{cases}\sin(|m|\phi) & m<0\\ 1/\sqrt{2} & m=0\\ \cos(|m|\phi) & m>0\end{cases} \quad \text{(i)}$$

Where 1≥0, −1≥m≥1, 1 and m are often known respectively as the "order" and "index" of the particular spherical harmonic, and the $P_l^{|m|}$ are the associated Legendre polynomials. Further, for convenience, we re-index the spherical harmonics as $Y_n(\theta, \phi)$ where n≥0 packs the value for 1 and m in a sequence that encodes lower orders first. We use:

$$n=l(l+1)+m \quad \text{(ii)}$$

These $Y_n(\theta, \phi)$ can be used to represent any piece-wise continuous function $f(\theta, \phi)$ which is defined over the whole of a sphere, such that:

$$f(\theta,\phi)=\sum_{i=0}^{\infty}a_i,\,Y_i(\theta,\phi) \quad \text{(iii)}$$

Because the spherical harmonics $Y_i(\theta, \phi)$ are orthonormal under integration over the sphere, it follows that the $a_i$ can be found from:

$$a_i=\int_0^{2\pi}\int_{-1}^{1}Y_i(\theta,\phi)f(\theta,\phi)d(\cos\theta)d\phi \quad \text{(iv)}$$

which can be solved analytically or numerically.

A series such as that shown in equation iii) can be used to represent a soundfield around a central listening point at the origin in the time or frequency domains. Truncating the series of equation iii) at some limiting order L gives an approximation to the function $f(\theta, \phi)$ using a finite number of components. Such a truncated approximation is typically a smoothed form of the original function:

$$f(\theta,\phi)\approx\sum_{i=0}^{(L+1)^2-1}a_iY_i(\theta,\phi) \quad \text{(v)}$$

The representation can be interpreted so that function $f(\theta, \phi)$ represents the directions from which plane waves are incident, so a plane wave source incident from a particular direction is encoded as:

$$a_i=4\pi Y_i(\theta,\phi) \quad \text{(vi)}$$

Further, the output of a number of sources can be summed to synthesise a more complex soundfield. It is also possible to represent curved wave fronts arriving at the central listening point, by decomposing a curved wavefront into plane waves.

Thus the truncated a, series of equation vi), representing any number of sound components, can be used to approximate the behaviour of the soundfield at a point in time or frequency. Typically a time series of such $a_i(t)$ are provided as an encoded spatial audio stream for playback and then a decoder algorithm is used to reconstruct sound according to physical or psychoacoustic principles for a new listener. Such spatial audio streams can be acquired by recording techniques and/or by sound synthesis. The four-channel Ambisonic B-Format representation can be shown to be a simple linear transformation of the L=1 truncated series v).

Alternatively, the time series can be transformed into the frequency domain, for instance by windowed Fast Fourier Transform techniques, providing the data in form $a_i(\omega)$, where $\omega=2\pi f$ and f is frequency. The $a_i(\omega)$ values are typically complex in this context.

Further, a mono audio stream m(t) can be encoded to a spatial audio stream as a plane wave incident from direction ($\theta$, $\phi$) using the equation:

$$a_i(t)=4\pi Y_i(\theta,\phi)m(t) \tag{vii}$$

which can be written as a time dependent vector a(t).

Before playback, the spatial audio data must be decoded to provide a speaker feed, that is, data for each individual speaker used to playback the sound data to reproduce the sound. This decoding may be performed prior to writing the decoded data on e.g. a DVD for supply to the consumer; in this case, it is assumed that the consumer will use a predetermined speaker arrangement including a predetermined number of speakers. In other cases the spatial audio data may be decoded "on the fly" during playback.

Methods of decoding spatial audio data such as ambisonic audio data typically involve calculating a speaker output, in either the time domain or the frequency domain, perhaps using time domain filters for separate high frequency and low frequency decoding, for each of the speakers in a given speaker arrangement that reproduce the soundfield represented by the spatial audio data. At any given time all speakers are typically active in reproducing the soundfield, irrespective of the direction of the source or sources of the soundfield. This requires accurate set-up of the speaker arrangement and has been observed to lack stability with respect to speaker position, particularly at higher frequencies.

It is known to apply transforms to spatial audio data, which alter spatial characteristics of the soundfield represented. For example, it is possible to rotate or mirror an entire sound field in the ambisonic format by applying a matrix transformation to a vector representation of the ambisonic channels. It is an object of the present invention to provide methods of and systems for manipulating and/or decoding audio data, to enhance the listening experience for the listener. It is a further object of the present invention to provide methods and systems for manipulating and decoding spatial audio data which do not place an undue burden on the audio system being used.

SUMMARY

In accordance with a first aspect of the present invention, there is provided a method of processing a spatial audio signal, the method comprising: receiving a spatial audio signal, the spatial audio signal representing one or more sound components, which sound components have defined direction characteristics and one or more one sound characteristics; providing a transform for modifying one or more sound characteristic of the one or more sound components whose defined direction characteristics relate to a defined range of direction characteristics; applying the transform to the spatial audio signal, thereby generating a modified spatial audio signal in which one or more sound characteristic of one or more of said sound components are modified, the modification to a given sound component being dependent on a relationship between the defined direction characteristics of the given component and the defined range of direction characteristics; and outputting the modified spatial audio signal.

This allows spatial audio data to be manipulated, such that sound characteristics, such as frequency characteristics and volume characteristics, can be selectively altered in dependence on their direction.

The term sound component here refers to, for example, a plane wave incident from a defined direction, or sound attributable to a particular source, whether that source be stationary or moving, for example in the case of a person walking.

In accordance with a second aspect of the present invention, there is provided a method of decoding a spatial audio signal, the method comprising: receiving a spatial audio signal, the spatial audio signal representing one or more sound components, which sound components have defined direction characteristics, the signal being in a format which uses a spherical harmonic representation of said sound components; performing a transform on the spherical harmonic representation, the transform being based on a predefined speaker layout and a predefined rule, the predefined rule indicating a speaker gain of each speaker arranged according to the predefined speaker layout when reproducing sound incident from a given direction, the speaker gain of a given speaker being dependent on said given direction, the performance of the transform resulting in a plurality of speaker signals each defining an output of a speaker, the speaker signals being capable of controlling speakers arranged according to the predefined speaker layout to generate said one or more sound components in accordance with the defined direction characteristics; and outputting a decoded signal.

The rule referred to here may be a panning rule.

This provides an alternative to existing techniques for decoding audio data which uses a spherical harmonic representation, in which the resulting sound generated by the speakers provides a sharp sense of direction, and is robust with respect to speaker set up, and inadvertent speaker movement.

In accordance with a third aspect of the present invention, there is provided a method of processing an audio signal, the method comprising: receiving a request for a modification to the audio signal, said modification comprising a modification to at least one of the predefined format and the one or more defined sound characteristics; in response to receipt of said request, accessing a data storage means storing a plurality of matrix transforms, each said matrix transform being for modifying at least one of a format and a sound characteristic of an audio stream; identifying a plurality of combinations of said matrix transforms, each of the identified combinations being for performing the requested modification; in response to a selection of a said combination, combining the matrix transforms of the selected combination into a combined transform; applying the combined transform to the received audio signal, thereby generating a modified audio signal; and outputting the modified audio signal.

Identifying multiple combinations of matrix transforms for performing a requested modification enables, for example, user preferences to be taken into consideration when selecting chains of matrix transforms; combining the matrix transforms of a selected combination allows quick and efficient processing of complex transform operations.

Further features and advantages of the invention will become apparent from the following description of preferred embodiments of the invention, given by way of example only, which is made with reference to the accompanying drawings.

DETAILED DESCRIPTION OF THE INVENTION

Figure 1:
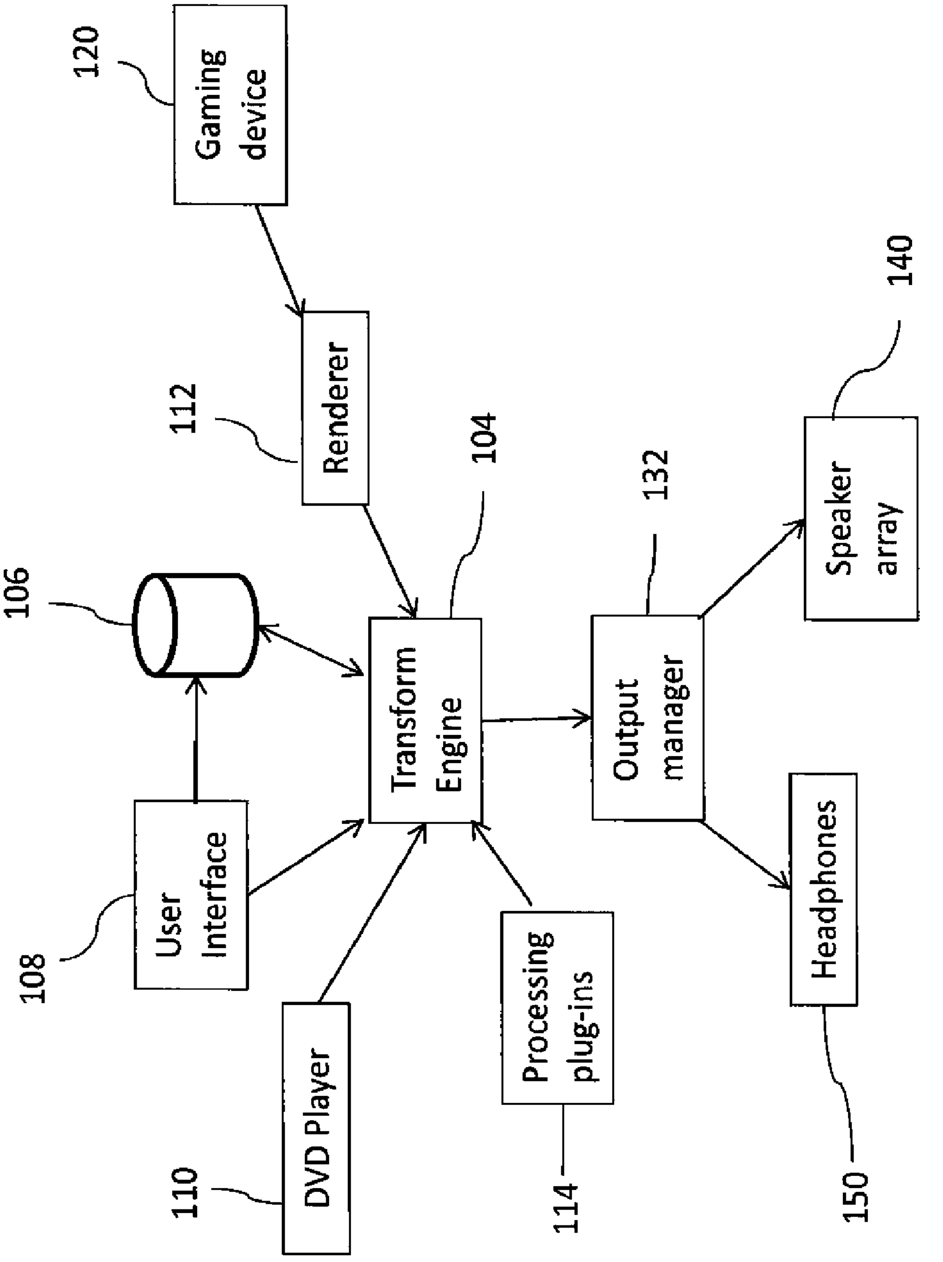
FIG. 1 is a schematic diagram showing a first system in which embodiments of the present invention may be implemented to provide reproduction of spatial audio data.

FIG. 1 shows an exemplary system 100 for processing and playing audio signals according to embodiments of the present invention. The components shown in FIG. 1 may each be implemented as hardware components, or as software components running on the same or different hardware. The system includes a DVD player 110 and a gaming device 120, each of which provides an output to a transform engine 104. The gaming device player 120 could be a general purpose PC, or a games console such as an "Xbox", for example.

The gaming device 120 provides an output, for example in the form of OpenAL calls from a game being played, to a renderer 112 and uses these to construct a multi-channel audio stream representing the game sound field in a format such as Ambisonic B format; this Ambisonic B format stream is then output to the transform engine 104

The DVD player 110 may provide an output to the transform engine 104 in 5.1 surround sound or stereo, for example.

The transform engine 104 processes the signal received from the gaming device 120 and/or DVD player 110, according to one of the techniques described below, providing an audio signal output in a different format, and/or representing a sound having different characteristics from that represented by the input audio stream. The transform engine 104 may additionally or alternatively decode the audio signal according to techniques described below. Transforms for use in this processing may be stored in a transform database 106; a user may design transforms and store these in the transform database 106, via the user interface 108. The transform engine 104 may receive transforms from one or more processing plug-ins 114, which may provide transforms for performing spatial operations on the soundfield such as rotation, for example.

The user interface 108 may also be used for controlling aspects of the operation of the transform engine 104, such as selection of transforms for use in the transform engine 104.

A signal resulting from the processing performed by the transform engine from this processing is then output to an output manager 132 which manages the relationship between the formats used by the transform engine 104 and the output channels available for playback, by, for example, selecting an audio driver to be used and providing speaker feeds appropriate to the speaker layout used. In the system 100 shown in FIG. 1, output from the output manager 132 can be provided to headphones 150 and/or a speaker array 140.

Figure 2:
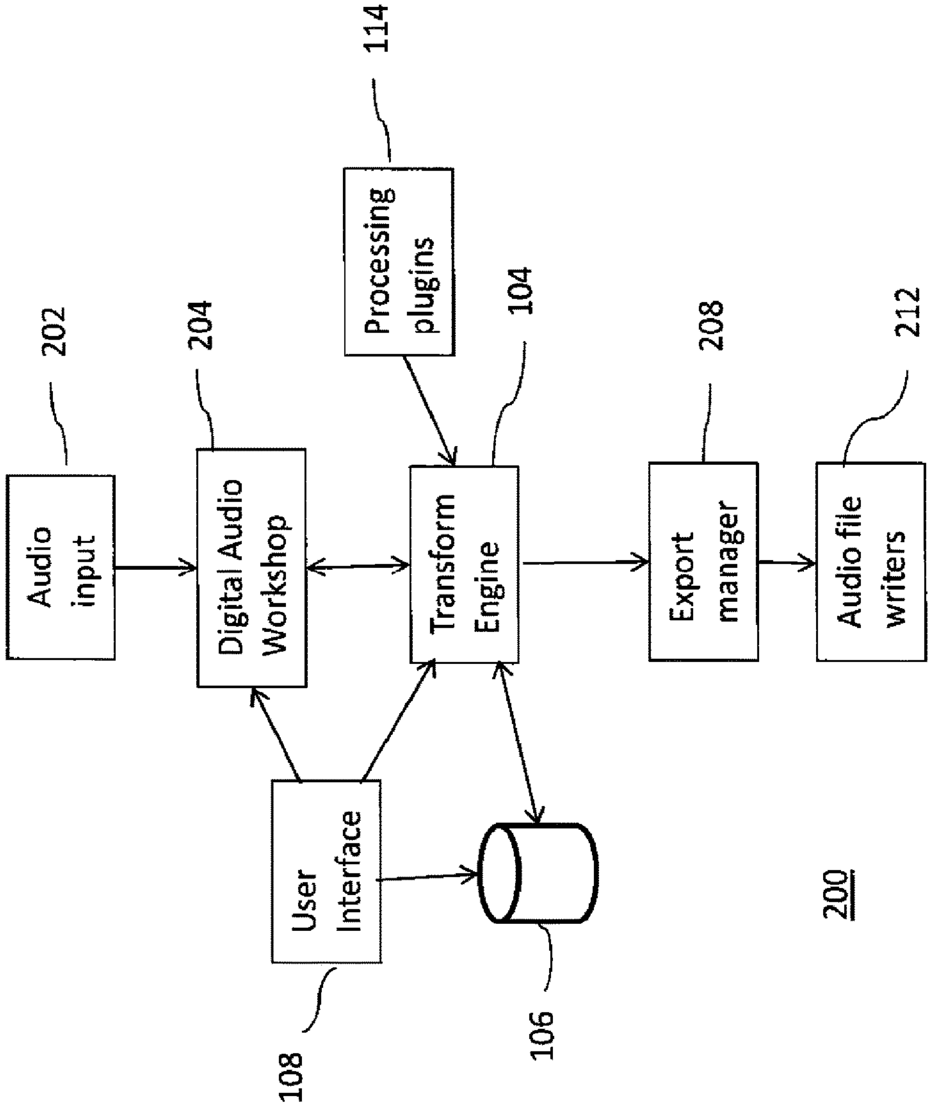
FIG. 2 is a schematic diagram showing a second system in which embodiments of the present invention may be implemented to record spatial audio data.

FIG. 2 shows an alternative system 200 in which embodiments of the present invention can be implemented. The system of FIG. 2 is used to encode and/or record audio data. In this system, an audio input, such as a spatial microphone recording and/or other input is connected to a Digital Audio Workstation (DAW) 204, which allows the audio data to be edited and played back. The DAW may be used in conjunction with the transform engine 104, transform database 106 and/or processing plugins 114 to manipulate the audio input(s) in accordance with the techniques described below, thereby editing the received audio input into a desired form. Once the audio data is edited into the desired form, it is sent to the export manager 208, which performs functions such as adding metadata relating to, for example, the composer of the audio data. This data is then passed to an audio file writer 212 for writing to a recording medium.

We now provide a detailed description of functions of transform engine 104. The transform engine 104 processes an audio stream input to generate an altered audio stream, where the alteration may include alterations to the sound represented and/or alteration of the format of the spatial audio stream; the transform engine may additionally or alternatively perform decoding of spatial audio streams. In some cases the alteration may include applying the same filter to each of a number of channels.

The transform engine 104 is arranged to chain together two or more transforms to create a combined transform, resulting in faster and less resource-intensive processing than in prior art systems which perform each transform individually. The individual transforms that are combined to form the combined transform may be retrieved from the transform database 106, supplied by user configurable processing plug-ins. In some cases they may be directly calculated, for example, to provide a rotation of the sound, the angle of which may be selected by the user via the user interface 108.

Transforms can be represented as matrices of Finite Impulse Response (FIR) convolution filters. In the time domain, we index the elements of these matrices as $p_{ij}(t)$. For the purposes of description, we assume that the FIRs are digital causal filters of length T. Given a multichannel signal $a_i(t)$ with m channels, the multichannel output $b_j(t)$ with n channels is given by:

$$b_j(t) = \sum_{i=0}^{m} \sum_{s=0}^{T-1} p_{ij}(s) a_j(t-s) \quad (1)$$

An equivalent representation of a time-domain transform can be provided by performing an invertible Discrete Fourier Transform (DFT) on each of the matrix components. The components can be then be represented as $\hat{p}_{ij}(\omega)$ where $\omega=2\pi f$ and $f$ is frequency.

In this representation, and with an input audio stream $\hat{p}_{ij}(\omega)$ also represented in the frequency domain, the output stream $\hat{b}_j(\omega)$ for each audio channel j is given by:

$$\hat{b}_j(\omega) = \sum_{i=0}^{m} \hat{p}_{ij}(\omega)\hat{a}_j(\omega) \tag{2}$$

Note that this form (for each ω) is equivalent to a complex matrix multiplication. It is thus possible to represent a transform in matrix form as:

$$\hat{B}(\omega)=\hat{A}(\omega)\hat{P}(\omega) \tag{3}$$

where $\hat{A}(\omega)$ is a column vector having elements $\hat{a}_j(\omega)$ representing the channels of the input audio stream and $\hat{B}(\omega)$ is a column vector having elements $\hat{b}_j(\omega)$ representing the channels of the output audio stream.

Similarly if a further transform $\hat{Q}(\omega)$ is applied to the audio stream $\hat{B}(\omega)$, the output of the further transform $\hat{B}(\omega)$ can be represented as:

$$\hat{C}(\omega)=\hat{B}(\omega)\hat{Q}(\omega) \tag{4}$$

By substituting equation (3) into equation (4) we find:

$$\hat{C}(\omega)=\hat{A}(\omega)\hat{P}(\omega)\hat{Q}(\omega) \tag{5}$$

It is therefore possible to find a single matrix $$\hat{R}(\omega)=\hat{P}(\omega)\hat{Q}(\omega) \tag{6}$$

for each frequency such that the transforms of equations (3) and (4) can be performed as a single transform:

$$\hat{C}(\omega)=\hat{A}(\omega)\hat{R}(\omega) \tag{7}$$

which can be expressed as:

$$\hat{c}_j(\omega) = \sum_{i=0}^{m} \hat{r}_{ij}(\omega)\hat{a}_j(\omega) \tag{8}$$

It will be appreciated that this approach can be extended to combine any number of transforms into an equivalent combined transform, by iterating the steps described above in relation to equations (3) to (7). Once the new frequency domain transform has been formed, it may be transformed back to the time domain. Alternatively the transform can be performed in the frequency domain, as is now explained.

An audio stream can be cut into blocks and transferred into the frequency domain by, for example, DFT, using windowing techniques such as are typically used in Fast Convolution algorithms. The transform can then be implemented in the frequency domain using equation (8) which is much more efficient than performing the transform in the time domain because there is no summation over s (compare equations (1) and (8)). An Inverse Discrete Fourier Transform (IDFT) can then be performed on the resulting blocks and the blocks can then be combined together into a new audio stream, which is output to the output manager.

Chaining transforms together in this way allows multiple transforms to be performed as a single, linear transform, meaning that complicated data manipulations can be performed quickly and without heavy burden on the resources of the processing device.

We now provide some examples of transforms that may be implemented using the transform engine 104.

Format Transforms

It may be necessary to change the format of the audio stream in cases where the input audio stream is not compatible with the speaker layout used, for example, where the input audio stream is a HOA stream, but the speakers are a pair of headphones. Alternatively, or additionally, it may be necessary to change formats in order to perform operations such as tinting (see below) which require a spherical harmonic representation of the audio stream. Some examples of format transforms are now provided.

Matrix Encoded Audio

Some stereo formats encode spatial information by manipulation of phase; for example Dolby Stereo encodes a four channel speaker signal into stereo. Other examples of matrix encoded audio include, Matrix QS, Matrix SQ and Ambisonic UHJ stereo. Transforms for transforming to and from these formats may be implemented using the transform engine 104.

Ambisonic A-B Format Conversion

Ambisonic microphones typically have a tetrahedral arrangement of capsules that produce an A-Format signal. In prior art systems, this A-Format signal is typically converted to a B-Format spatial audio stream by a set of filters, a matrix mixer and some more filters. In a transform engine 104 according to embodiments of the present invention, this combination of operations can be combined into a single transform from A-Format to B-Format.

Virtual Sound Sources

Given a speaker feed format (e.g. 5.1 surround sound data) it is possible to synthesise an abstract spatial representation by feeding the audio for each these speaker channels through a virtual sound source placed in a particular direction.

This results in a matrix transform from the speaker feed format to a spatial audio representation; see the section below titled "constructing spatial audio streams from panned material", for another method of constructing spatial audio streams.

Virtual Microphones

Given an abstract spatial representation of an audio stream it is typically possible to synthesise a microphone response in particular directions. For instance, a stereo feed can be constructed from an Ambisonic signal using a pair of virtual cardioid microphones pointing in user-specified directions.

Identity Transforms

Sometimes it is useful to include identity transforms (i.e. transforms that do not actually modify the sound) in the database to help the user convert between formats; this is useful when it is clear that sound can be represented in a different way, for example. For instance, it may be useful to convert Dolby Stereo data to stereo for burning to a CD.

Other Simple Matrix Transforms

Other examples of simple transforms include conversion from a 5.0 surround sound format to 5.1 surround sound format, for instance by the simple inclusion of a new (silent) bass channel, or upsampling a second order Ambisonic stream to third order by the addition of silent third order channels.

Similarly, simple linear combinations, e.g. to convert from L/R standard stereo to a mid/side representation can be represented as simple matrix transformations.

HRTF Stereo

Abstract spatial audio streams can be converted to stereo suitable for headphones using HRTF (Head-Related Transfer Function) data. Here filters will typically be reasonably complex as the resulting frequency content is dependent on the direction of the underlying sound sources.

Ambisonic Decoding

Ambisonic decoding transforms typically comprise matrix manipulations taking an Ambisonic spatial audio stream and converting for a particular speaker layout. These can be represented as simple matrix transforms. Dual-band decoders can also be represented by use of two matrices combined using a cross-over FIR or IIR filter.

Such decoding techniques attempt to reconstruct the perception of soundfield represented by the audio signal. The result of ambisonic decoding is a speaker feed for each speaker of the layout; each speaker typically contributes to the soundfield irrespective of the direction of the sound sources contributing to it. This produces an accurate reproduction of the soundfield at and very near the centre of the area in which the listener is assumed to be located (the "sweet area"). However, the dimensions of the sweet area produced by ambisonic decoding are typically of the order of the wavelength of the sound being reproduced. The range of human hearing perception ranges between wavelengths of approximately 17 mm and 17 m; particularly at small wavelengths, the area of the sweet area produced is therefore small, meaning that accurate speaker set-up is required, as described above.

Projected Panning

In accordance with some embodiments of the present invention, a method of decoding a spatial audio stream which uses a spherical harmonic representation is provided in which the spatial audio stream is decoded into speaker feeds according to a panning rule. The following description refers to an Ambisonic audio stream, but the panning technique described here can be used with any spatial audio stream which uses a spherical harmonic representation; where the input audio stream is not in such a form, it may be converted into a spherical harmonic format by the transform engine 104, using, for example, the technique described above in the section titled "virtual sound sources".

In panning techniques, one or more virtual sound sources are recreated; panning techniques are not based on soundfield reproduction as is used in the ambisonic decoding technique described above. A rule, often called a panning rule, is defined which specifies, for a given speaker layout, a speaker gain for each speaker when reproducing sound incident from a sound source in a given direction. The soundfield is thus reconstructed from a superposition of sound sources.

An example of this is Vector Base Amplitude Panning (VBAP), which typically uses two or three speakers out of a larger set of speakers that are close to the intended direction of the sound source.

For any given panning rule, there is some real or complex gain function $s_j(\theta, \phi)$, for each speaker j, that can be used to represent the gain that should be produced by the speaker given a source in a direction $(\theta, \phi)$. The $s_j(\theta, \phi)$ are defined by the particular panning rule being used, and the speaker layout. For example, in the case of VBAP, $s_j(\theta, \phi)$ will be zero over most of the unit sphere, except for when the direction $(\theta, \phi)$ is close to the speaker in question.

Each of these $s_j(\theta, \phi)$ can be represented as the sum of spherical harmonic components $Y_i(\theta, \phi)$:

$$s_j(\theta, \phi) = \sum_{i=0}^{\infty} q_{i,j} Y_i(\theta, \phi) \tag{9}$$

Thus, for a sound incident from a particular direction $(\theta, \phi)$, the actual speaker outputs are given by:

$$v_j(t) = s_j(\theta, \phi) m(t) \tag{10}$$

where m(t) is a mono audio stream. The $v_j(t)$ can represented as a series of spherical harmonic components:

$$v_j(t) = \sum_{i=0}^{\infty} q_{i,j} Y_i(\theta, \phi) m(t) \tag{11}$$

The $q_{i,j}$ can be found as follows, performing the integration required analytically or numerically:

$$q_{i,j} = \int_0^{2\pi} \int_{-1}^{1} Y_i(\theta, \phi) v_j(\theta, \phi) d(\cos\theta) d\phi \tag{12}$$

If we truncate the representations in use to some order of spherical harmonic, we can construct a matrix P such that each element is defined by:

$$p_{i,j} = \frac{1}{4\pi} q_{i,j} \tag{13}$$

From equation vii), the sound can be represented in a spatial audio stream as:

$$a_i(t) = 4\pi Y_i(\theta, \phi) m(t) \tag{14}$$

We can thus produce a speaker output audio stream with the equation:

$$w^T = a^t P \tag{15}$$

P depends only on the panning rule and the speaker locations and not on the particular spatial audio stream, so this can be fixed before audio playback begins.

If the audio stream a contains just the component from a single plane wave, the components within the w vector now have the following values:

$$w_j(t) = \sum_{i=0}^{(L+1)^2-1} a_i(t) p_{i,j} \tag{16}$$

$$w_j(t) = \sum_{i=0}^{(L+1)^2-1} 4\pi Y_i(\theta, \phi) m(t) \frac{1}{4\pi} q_{i,j} \tag{17}$$

$$w_j(t) = \sum_{i=0}^{(L+1)^2-1} q_{i,j} Y_i(\theta, \phi) m(t) \tag{18}$$

To the accuracy of the series truncation in use, equation (18) is the same as the speaker output provided by the panning according to equation (11).

This provides a matrix of gains which, when applied to a spatial audio stream, produces a set of speaker outputs. If a sound component is recorded to the spatial audio stream in a particular direction, then the corresponding speaker outputs will be in the same or similar direction to that achieved if the sound had been panned directly.

Since equation (15) is linear, it can be seen that it can be applied for any sound field which can be represented as a superposition of plane wave sources. Furthermore, it is possible to extend the above analysis to take account of curvature in the wave front, as explained above.

This approach entirely separates the use of the panning law from the spatial audio stream in use and, in contrast to the ambisonic decoding technique described above, aims at reconstructing individual sound sources, rather than reconstructing the perception of the soundfield. It is thus possible to work with a recorded or synthetic spatial audio stream, potentially including a number of sound sources and other components (e.g. additional material caused by real or synthetic reverb) that may have otherwise been manipulated (e.g. by rotation or tinting-see below) without any information about the subsequent speakers which are going to be used to play it. Then, we apply the panning matrix P directly to the spatial audio stream to find audio streams for the actual speakers.

Since, in the panning technique used here, typically only two or three speakers are used to reproduce a sound source from any given angle, this has been observed to achieve a sharper sense of direction; this means that the sweet area is large, and robust with respect to speaker layout. In some embodiments of the present invention, the panning technique described here may be used to decode the signal at higher frequencies, with the Ambisonic decoding technique described above used at lower frequencies.

Further, in some embodiments, different decoding techniques may be applied to different spherical harmonic orders; for example, the panning technique could be applied to higher orders with Ambisonic decoding applied to lower orders. Further, since the terms of the panning matrix P depend only on the panning rule in use, it is possible to select a panning rule appropriate to the particular speaker layout being used; in some situations VBAP is used, in other situations other panning rules such as linear panning and/or constant power panning is used. In some cases, different panning rules may be applied to different frequency bands.

The series truncation in equation (18) typically has the effect of slightly blurring the speaker audio stream. Under some circumstances, this can be a useful feature as some panning algorithms suffer from perceived discontinuities when sounds pass close to actual speaker directions.

As an alternative to truncating the series, it is also possible to find the $q_{i,j}$ using some other technique, for example a multi-dimensional optimisation method, such as Nelder and Mead's downhill simplex method.

In some embodiments, speaker distance and gains are compensated for through use of delays and gain applied to out speaker outputs in the time domain, or phase and gain modifications in the frequency domain. Digital Room Correction may also be used. These manipulations can be represented by extending the $s_j(\theta, \phi)$ functions above by multiply them by a (potentially frequency-dependent) term before the $q_{i,j}$ terms are found. Alternatively, the multiplication can be applied after the panning matrix is applied. In this case, it might be appropriate to apply phase modifications by time-domain delay and/or other Digital Room Correction techniques.

Figure 3:
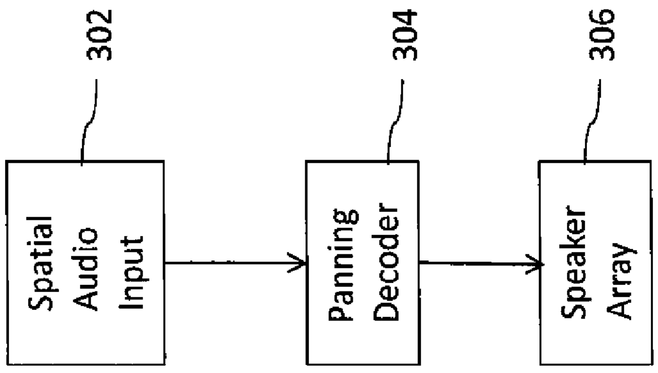
FIG. 3 is a schematic diagram of a components arranged to perform a decoding operation according to any embodiment of the present invention.

It is convenient to combine the panning transform of equation (15) with other transforms as part of the processing of the transform engine 104, to provide a decoded output representing individual speaker feeds. However, in some embodiments of the present invention, the panning transform may be applied independently of other transforms, using a panning decoder, as is shown in FIG. 3. In the example of FIG. 3, a spatial audio signal 302 is provided to a panning decoder 304, which may be a standalone hardware or software component, and which decodes the signal according to the above panning technique, and appropriate to the speaker array 306 being used. The decoded individual speaker feeds are then sent to the speaker array 306.

Constructing Spatial Audio Streams From Panned Material

Many common formats of surround sound use a set of predefined speaker locations (e.g. for ITU 5.1 surround sound) and sound panning in the studio typically makes use of a single panning technique (e.g. pairwise vector panning) provided by whatever mixing desk or software is in use. The resulting speaker outputs s are provided to the consumer, for instance on DVD.

When the panning technique is known, it is possible to approximate the studio panning technique used with a matrix P as above.

We can then invert matrix P to find a matrix R that can be applied to the speaker feeds s, to contruct a spatial audio feed a using:

$$a^T = s^T R \tag{19}$$

Note that the inversion of matrix P is likely to be non-trivial, as in most cases P will be singular. Because of this, matrix R will typically not be a strict inverse, but instead a pseudo-inverse or another inverse substitute found by single value decomposition (SVD), regularisation or another technique.

A tag within the data stream provided on the DVD or suchlike to whatever player software is in use could be used to determine the panning technique in use to avoid the player guessing the panning technique or requiring the listener to choose one. Alternatively, a representation or description of P or R could be included in the stream.

The resulting spatial audio feed $a^T$ can then be manipulated, according to one or more techniques described herein, and/or decoded using an Ambisonic decoder or a panning matrix based on the speakers actually present in the listening environment, or another decoding approach.

General Transforms

Some transforms can be applied to essentially any format, without changing the format. For example, any feed can be amplified by application of a simple gain to the stream, formed as diagonal matrix with a fixed value. It is also possible to filter any given feed using an arbitrary FIR applied to some or all channels.

Spatial Transforms

This section describes a set of manipulations that can be performed on spatial audio data represented using spherical harmonics. The data remains in the spatial audio format.

Rotation and Reflection

The sound image can be rotated, reflected and/or tumbled using one or more matrix transforms; for example, rotation as explained in "Rotation Matrices for Real Spherical Harmonics. Direct Determination by Recursion", Joseph Ivanic and Klaus Ruedenberg, J. Phys. Chem., 1996, 100 (15), pp 6342-6347.

Tinting

In accordance with embodiments of the present invention, a method of altering the characteristics of sound in particular directions is provided. This can be used to emphasise or diminish the level of sound in a particular direction or directions, for example. The following explanation refers to an ambisonic audio stream; however, it will be understood that the technique can be used with any spatial audio stream which uses representations in spherical harmonics. The technique can also be used with audio streams that do not use a spherical harmonic representation by first converting the audio stream to a format which does use such a representation.

Supposing an input audio stream $a^T$ which uses a spherical harmonic representation of a sound field $f(\theta, \phi)$ in the time or frequency domain, and it is desired to generate an output audio stream $b^T$ representing a sound field $g(\theta, \phi)$ in which the level of sound in one or more directions is altered, we can define a function $h(\theta, \phi)$ such that:

$$g(\theta,\phi)=f(\theta,\phi)h(\theta,\phi) \tag{20}$$

For example, $h(\theta, \phi)$ could be defined as:

$$h(\theta, \phi) = \begin{cases} 2 & \phi < \pi \\ 0 & \phi \geq \pi \end{cases} \tag{21}$$

This would have the effect of making $g(\theta, \phi)$ twice as loud as $f(\theta, \phi)$ on the left and silent on the right. In other words, a gain of 2 is applied to sound components having a defined direction lying in the angular range $\phi<\pi$, and a gain of 0 is applied to sound components having a defined direction lying in the angular range $\phi\geq\pi$.

Assuming that $f(\theta, \phi)$ and $h(\theta, \phi)$ are both piece-wise continuous, then so is their product $g(\theta, \phi)$, which means that all three can be represented in terms of spherical harmonics.

$$f(\theta, \phi) = \sum_{i=0} a_i Y_i(\theta, \phi) \tag{22}$$

$$g(\theta, \phi) = \sum_{j=0} b_j Y_j(\theta, \phi) \tag{23}$$

$$h(\theta, \phi) = \sum_{k=0} c_k Y_k(\theta, \phi) \tag{24}$$

We can find the value of the $b_j$ as follows, using equation iv):

$$b_j = \int_0^{2\pi} \int_{-1}^{1} Y_j(\theta, \phi) g(\theta, \phi) d(\cos\theta) d\phi \tag{25}$$

Using equation (20):

$$b_j = \int_0^{2\pi} \int_{-1}^{1} Y_j(\theta, \phi) f(\theta, \phi) h(\theta, \phi) d(\cos\theta) d\phi \tag{26}$$

Using equations (22) and (24):

$$b_j = \int_0^{2\pi} \int_{-1}^{1} Y_j(\theta, \phi) \sum_{i=0} a_i Y_i(\theta, \phi) \sum_{k=0} c_k Y_k(\theta, \phi) d(\cos\theta) d\phi \tag{27}$$

$$b_j = \sum_{i=0} a_i \sum_{k=0} c_k \int_0^{2\pi} \int_{-1}^{1} Y_i(\theta, \phi) Y_j(\theta, \phi) Y_k(\theta, \phi) d(\cos\theta) d\phi \tag{28}$$

$$b_j = \sum_{i=0} a_i \sum_{k=0} c_k w_{i,j,k} \tag{29}$$

Where $$w_{i,j,k} = \int_0^{2\pi} \int_{-1}^{1} Y_i(\theta, \phi) Y_j(\theta, \phi) Y_k(\theta, \phi) d(\cos\theta) d\phi \tag{30}$$

These $\omega_{i,j,k}$ terms are independent of f, g and h and can be found analytically (they can be expressed in terms of Wigner-3j symbols, used in the study of quantum systems) or numerically. In practice, they can be tabulated.

If we truncate the series used to represent functions $f(\theta, \phi)$, $g(\theta, \phi)$ and $h(\theta, \phi)$, equation (29) takes the form of a matrix multiplication. If we place the $a_i$ terms in vector $a^T$ and the $b_j$ terms in $b^T$, then:

$$b^T = a^T C \tag{31}$$

$$\text{Where } C = \begin{pmatrix} \sum_k c_k w_{0,0,k} & \sum_k c_k w_{0,1,k} & \cdots & \cdots \\ \sum_k c_k w_{1,0,k} & \sum_k c_k w_{1,1,k} & \cdots & \cdots \\ \sum_k c_k w_{2,0,k} & \sum_k c_k w_{2,1,k} & \cdots & \cdots \\ \cdots & \cdots & \cdots & \cdots \end{pmatrix} \tag{32}$$

Note that in equation (31) the series has been truncated in accordance with the number of audio channels in the input audio stream $a^T$; if more accurate processing is required, this can be achieved by appending zeros to increase the number of terms in $a^T$ and extending the series up to the order required. Further, if the tinting function $h(\theta, \phi)$ is not defined to a high enough order, its truncated series can also be extended to the order required by appending zeroes.

The matrix C is not dependent on $f(\theta, \phi)$ or $g(\theta, \phi)$; it is only dependent on our tinting function $h(\theta, \phi)$. We can thus find a fixed linear transformation in the time or frequency domain that can be used to perform a manipulation on a spatial audio stream represented using spherical harmonics. Note that in the frequency domain, there may be a different matrix required for each frequency.

Although in this example, the tinting function h is defined has having a fixed value over a fixed angular range, embodiments of the present invention are not limited to such cases. In some embodiments, the value of tinting function may vary according to angle within the defined angular range, or a tinting function may be defined having a non-zero value over all angles. The tinting function may vary with time.

Further, the relationship between the direction characteristics of the tinting function and the direction characteristics of the sound components may be complex, for example in the case that the sound components are assignable to a source spread over a wide angular range and/or varying with time and/or frequency.

Using this technique, it is thus possible to generate tinting transforms on the basis of defined tinting functions for use in manipulating spatial audio streams using spherical harmonic representations. A predefined function can thus be used to emphasise or diminish the level of sound in particular directions, for instance to change the spatial balance of a recording to bring out a quiet soloist who, in the input audio stream, is barely audible over audience noise. This requires that the direction of the soloist is known; this can be determined by observation of the recording venue, for example.

In the case that the tinting technique is used with a gaming system, for example, when used with the gaming device 120 and the transform engine 104 shown in FIG. 1, the gaming device 120 may provide the transform engine with information relating to a change in a gaming environment, which the transform engine 104 then uses to generate and/or retrieve an appropriate transform. For example, the gaming device 120 may provide the transform engine with data indicating that a user driving a car is, in the game environment, driving close to a wall. The transform engine 104 could then select and use a transform to alter characteristics of sound to take account of the wall's proximity.

Where $h(\theta, \phi)$ is in the frequency domain, changes made to the spatial behaviour of the field can be frequency-dependent. This could be used to perform equalisation in specified directions, or to otherwise alter the frequency characteristics of the sound from a particular direction, to make a particular sound component sound brighter, or to filter out unwanted pitches in a particular direction, for example.

Further, a tinting function could be used as a weighting transform during decoder design, including Ambisonic decoders, to prioritise decoding accuracy in particular directions and/or at particular frequencies.

By defining $h(\theta, \phi)$ appropriately, it is possible to extract data representing individual sound sources in known directions from the spatial audio stream, perform some processing on the extracted data, and re-introduce the processed data into the audio stream. For example, it is possible to extract the sound due to a particular section of an orchestra by defining $h(\theta, \phi)$ as 0 over all angles except those corresponding to the target orchestra section. The extracted data could then manipulated so that the angular distribution of sounds from that orchestra section are altered (e.g. certain parts of the orchestra section sound further to the back) before re-introducing the data back into the spatial audio stream. Alternatively, or additionally, the extracted data could be processed and introduced either at the same direction at which it was extracted, or at another direction. For example, the sound of a person speaking to the left could be extracted, processed to remove background noise, and re-introduced into the spatial audio stream at the left.

HRTF Tinting

As an example of frequency-domain tinting, we consider the case where $h(\theta, \phi)$ is used to represent HRTF data. Important cues that enable a listener to sense the direction of a sound source include Interaural Time Difference (ITD), that is the time difference between a sound arriving at the left ear and arriving at the right ear, and Interaural Intensity Difference (IID), that is the difference in sound intensity at the left and right ears. ITD and IID effects are caused by the physical separation of the ears and the effects that the human head has on an incident sound wave. HRTFs typically are used to model these effects by way of filters that emulate the effect of the human head on an incident sound wave, to produce audio streams for the left and right ears, particularly via headphones, thereby given an improved sense of the direction of the sound source for the listener, particularly in terms of the elevation of the sound source. However prior art methods do not modify a spatial audio stream to include such data; in prior art methods, the modification is made to a decoded signal at the point of reproduction.

We assume here that we have a symmetric representation of an HRTF for the left and right ears of form:

$$h_L(\theta, \phi) = \sum_{i=0}^{(L+1)^2-1} c_i Y_i(\theta, \phi) \tag{33}$$

$$h_R(\theta, \phi) = h_L(\theta, 2\pi - \phi) \tag{34}$$

The $c_i$ components that represent $h_L$ can be formed into a vector $c_L$ and a mono left-ear stream can be produced from a spatial audio stream $f(\theta, \phi)$ represented by spatial components $a_i$. A suitable stream for the left ear can be produced using a scalar product:

$$d_L = a, c_L \tag{35}$$

This reduces the full spatial audio stream to a single mono audio stream suitable for use with one of a pair of headphones etc. This is a useful technique, but does not result in a spatial audio stream.

In accordance with some embodiments of the present invention, the tinting technique described above is used to apply the HRTF data to the spatial audio stream and acquire a tinted spatial audio stream as a result of the manipulation, by converting $h_L$ to a tinting matrix of the form of equation (31). This has the effect of adding the characteristics of the HRTF to the stream. The stream can then go on to be decoded, prior to listening, in a variety of ways, for instance through an Ambisonic decoder.

For example, when using this technique with headphones, if we apply $h_L$ directly to the spatial audio stream we tint the spatial audio stream with information specifically for the left ear. In most symmetric applications, this stream would not be useful for the right ear, so we would also tint the soundfield to produce a separate spatial audio stream for the right ear, using equation (34).

Tinted streams of this form, with subsequent manipulation, can be used to drive headphones (e.g. in conjunction with a simple head model to derive ITD cues etc). Also, they have potential use with cross-talk cancellation techniques, to reduce the effect of sound intended for one ear being picked up by the other ear.

Further, in accordance with some embodiments of the present invention, $h_L$ can be decomposed as a product of two functions $a_L$ and $p_L$ which manage amplitude and phase components respectively for each frequency, where $a_L$ is real-valued and captures the frequency content in particular directions, and $p_L$ captures the relative interaural time delay (ITD) in phase form and has $|p_L|=1$.

$$h_L(\theta,\phi) = a_L(\theta,\phi) p_L(\theta,\phi) \tag{36}$$

We can decompose both the $a_L$ and $p_L$ as tinting functions and then explore errors that occur in their truncated representation. The $p_L$ representation becomes increasingly inaccurate at higher frequencies and $|p_L|$ drifts away from 1 affecting the overall amplitude content of $h_L$.

As ITD cues are less important at higher frequencies, at which IID clues become more important, $p_L$ can be modified so that it is 1 at higher frequencies and so the errors above are not introduced into the amplitude content. For each direction, the phase data can be used to construct delays $d(\theta, \phi, f)$ applying to each frequency $f$ such that $$p_L(\theta,\phi,f)=e^{-2\pi i f d(\theta,\phi,f)} \tag{37}$$

Then we can construct a new version of the phase information which is constrained over a particular frequency range $[f_1, f_2]$ by:

$$\hat{p}_L(\theta,\phi,f)=\begin{cases} e^{-2\pi i f d(\theta,\phi,f)} & f<f_1 \\ e^{-2\pi i f\left(\frac{f-f_1}{f_2-f_1}\right)d(\theta,\phi,f)} & f_1\le f\le f_2 \\ 1 & f_2<f \end{cases} \tag{38}$$

Note that $\hat{p}_L$ is thus 1 for $f>f_2$.

The d values can be scaled to model different sized heads.

The above d values can be derived from a recorded HRTF data set. As an alternative, a simple mathematical model of the head can be used. For instance, the head can be modelled as a sphere with two microphones inserted in opposite sides. The relative delays for the left ear are then given by:

$$d(\theta,\phi,f)=\begin{cases} -\frac{r}{c}\sin\theta\sin\phi & \phi>0 \\ \frac{r}{c}\sin^{-1}(\sin\theta\sin\phi) & \phi\le 0 \end{cases} \tag{39}$$

Where r is the radius of the sphere and c is the speed of sound.

As mentioned above, ITD and IID effects provide important cues for providing a sense of direction of a sound source. However, there are a number of points from which sound sources can generate the same ITD and IID cues. For instance, sounds at <1, 1, 0>, <−1, 1, 0> and <0, 1, 1> (defined with reference to a Cartesian coordinate system with x positive in the forwards direction, y positive to the left and z positive upwards, all with reference to the listener) will generate the same ITD and IID cues in symmetrical models of the human head. Each set of such points is known as a "cone of confusion" and it is believed that the human hearing system uses HRTF-type cues (among others, including head movement) to help resolve the sound location in this scenario.

Returning to $h_L$, data can be manipulated to remove all $c_i$ components that are not left-right symmetric. This results in a new spatial function that in fact only includes components that are shared between $h_L$ and $h_R$. This can be done by zeroing out all $c_i$ components in equation (30) that correspond to spherical harmonics that are not left-right symmetric. This is useful because it removes components that would be picked up by both left and right ears in a confusing way.

This results in a new tinting function, represented by a new vector, which can be used to tint a spatial audio stream and strengthen cues to help a listener resolve cone-of-confusion issues in a way that is equally useful to both ears. The stream can subsequently be fed to an Ambisonics or other playback device with the cues intact, resulting in a sharper sense of the direction of sound sources, even if there are not speakers in the relevant direction, for example even if the sound source is above or behind the listener, when there are no speakers there.

This approach works particularly well where it is known that the listener will be oriented a particular way, for instance while watching a film or stage, or playing a computer game. We can discard further components and leave only those which are symmetric around the vertical axis (i.e. those which do not depend on θ).

This results in a tinting function that strengthens height cues only. This approach makes fewer assumptions about the listener's orientation; the only assumption required is that the head is vertical. Note that, depending on the application, it may be desirable to apply some amount of both height and cone-of-confusion tinting to the spatial audio stream, or some directed component of these tinting functions Note that, depending on the application, both height and cone-of-confusion tinting, or some directed component of these functions, may be applied to the spatial audio stream.

Alternatively, or additionally, the technique of discarding components of the HRTF representation described above can also be used with pairwise panning techniques, and other applications where a spherical harmonic spatial audio stream is not in use. Here, we can work directly from the HRTF functions and generate appropriate HRTF cues using equation (30) above.

Gain Control

Depending on the application, it may be desirable to be able to control the amount of tinting applied, to make effects weaker or stronger. We observe that the tinting function can be written as:

$$h(\theta,\phi)=1+(h(\theta,\phi)-1) \tag{40}$$

We can then introduce a gain factor p into the equation as follows:

$$h(\theta,\phi)=1+p(h(\theta,\phi)-1) \tag{41}$$

Applying equations (18) to (29) above, we end up with a tinting matrix $C_p$ given by:

$$C_p=I+p(C-I) \tag{42}$$

where I is the identity matrix of the relevant size. p can then be used as a gain control to control the amount of tinting applied; p=0 causes the tinting to disappear entirely.

Further, if we wish to provide different amounts of tinting in a particular direction, we can apply tinting to h itself, or to the difference between h and the identity transform described by $(h(\theta, \phi)-1)$ as above, for instance only to apply tinting to sounds that are behind, or above a certain height. Additionally or alternatively, a tinting function could select audio above a certain height, and apply HRTF data to this selected data, leaving the rest of the data untouched.

Figure 4:
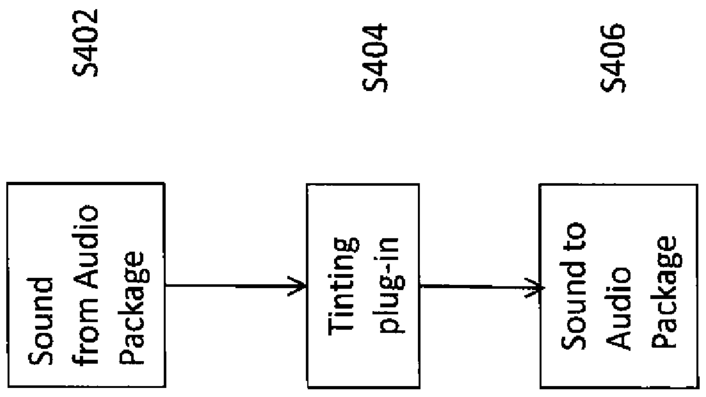
FIG. 4 is a flow diagram showing a tinting transform being performed in accordance with an embodiment of the present invention.
Figure 5:
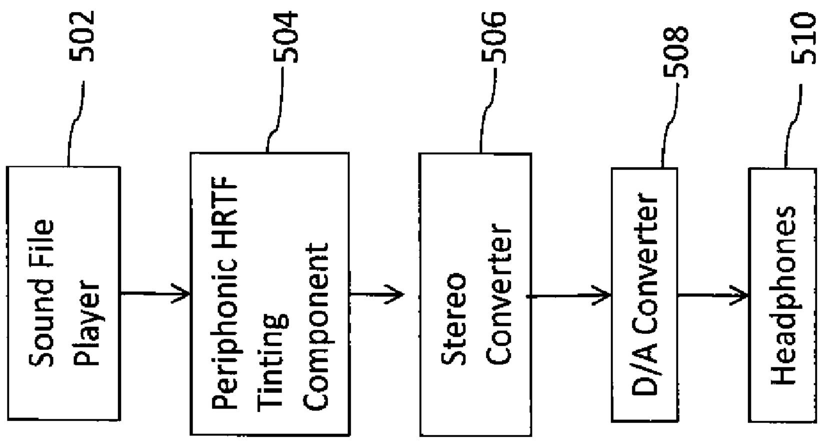
FIG. 5 is a schematic diagram of components arranged to perform a tinting transform in accordance with an embodiment of the present invention.

Although the tinting transforms described above may conveniently be implemented as part of processing performed by the transform engine, being stored in the transform database 106, or being supplied as a processing plugin 114 for example, in some embodiments of the present invention a tinting transform is implemented independently of the systems described in relation to FIGS. 1 and 2 above, as is now explained in relation to FIGS. 4 and 5.

FIG. 4 shows tinting being implemented as a software plug-in. Spatial audio data is received from a software package such as Nuendo at step S402. At step S404 it is processed according to a tinting technique described above, before being returned to the software audio package at step S406.

FIG. 5 shows tinting being applied to a spatial audio stream before being converted for use with headphones. A sound file player 502 passes spatial audio data to a periphonic HRTF tinting component 504, which performs HRTF tinting according to one of the techniques described above, resulting in a spatial audio stream with enhanced IID cues. This enhanced spatial audio stream is then passed to a stereo converter 506, which may further introduce ITD cues and reduce the spatial audio stream to stereo, using a simple stereo head model. This is then passed to a digital to analogue converter 508, and output to headphones 510 for playback to the listener. The components described here with reference to FIG. 5 may be software or hardware components.

It will be appreciated that the tinting techniques described above may be applied in many other contexts. For example, software and/or hardware components may be used in conjunction with game software, as part of a Hi-Fi system or a dedicated hardware device for use in studio recording.

Figure 6:
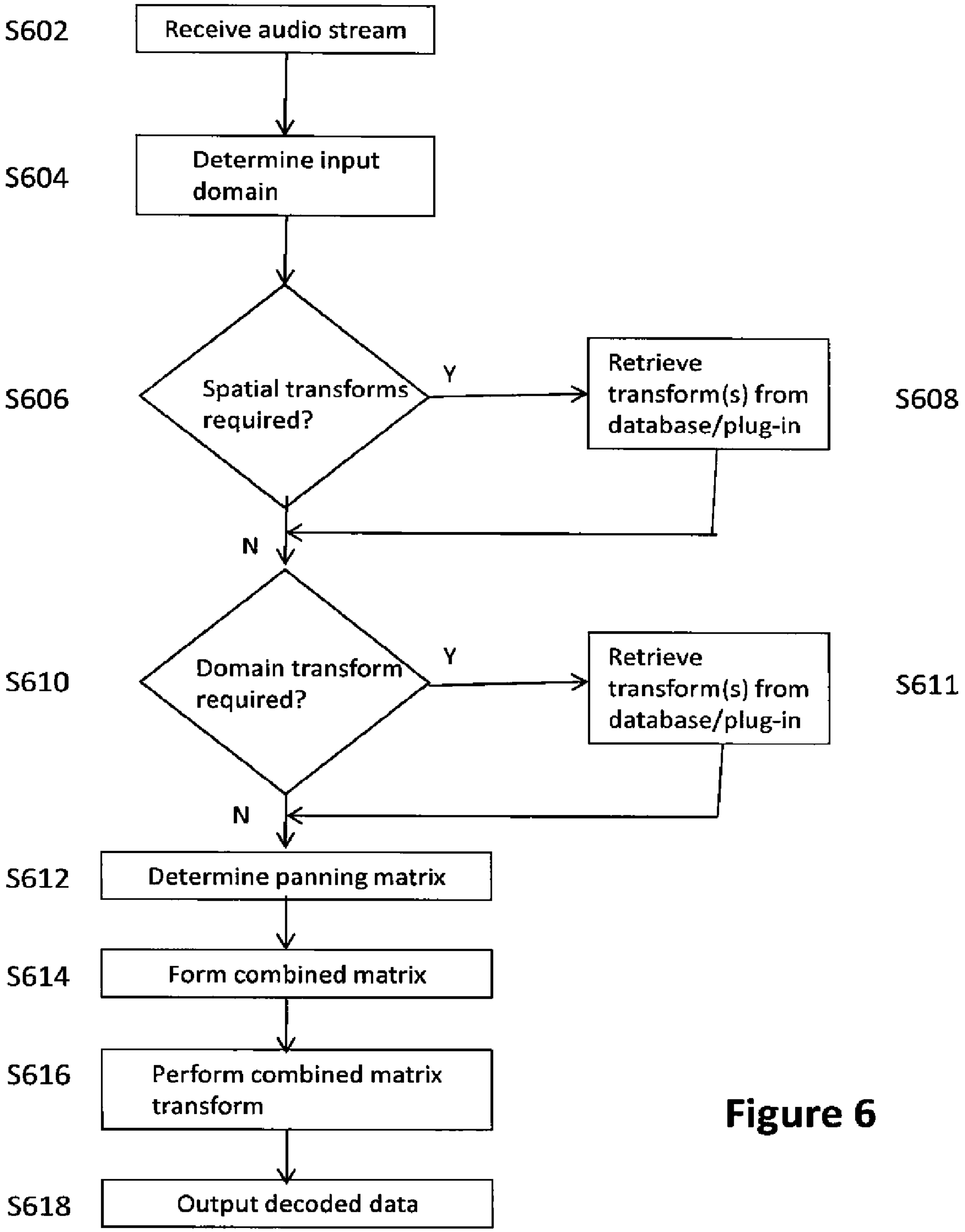
FIG. 6 is a flow diagram showing processes performed by a transform engine in accordance with an embodiment of the present invention.

Returning to the functioning of the transform engine 104, we now provide an example, with reference to FIG. 6, of the transform engine 104 being used to process and decode a spatial audio signal for use with a given speaker array 140.

At step S602, the transform engine 104 receives an audio data stream. As explained above, this may be from a game, a CD player, or any other source capable of supplying such data. At step S604, the transform engine 104 determines the input format, that is, the format of the input audio data stream. In some embodiments, the input format is set by the user using the user interface. In some embodiments, the input format is detected automatically; this may be done using flags included in the audio data or the transform engine may detect the format using a statistical technique.

At step S606, the transform engine 104 determines whether spatial transforms, such as the tinting transforms described above are required. Spatial transforms may be selected by the user using the user interface 108, and/or they may be selected by a software component; in the latter case, this could be, for example an indication in a game that the user has entered a different sound environment (for example, having exited from a cave into open space), requiring different sound characteristics.

If spatial transforms are required, these can be retrieved from the transform database 106; where a plug-in 114 is used, transforms may additionally or alternatively retrieved from the plug-in.

At step S610 the transform engine 104 determines whether one or more format transforms is required. Again this may be specified by the user via the user interface 108. Format transforms may additionally or alternatively be required in order to perform a spatial transform, for example if the input format does not use a spherical harmonic representation, and a tinting transform is to be used. If one or more format transforms are required, they are retrieved from the transform database 106 and/or plug-ins 114 at step S611.

At step S612, the transform engine 104 determines the panning matrix to be used. This is dependent on the speaker layout used, and the panning rule to be used with that speaker layout, both of which are typically specified by a user via the user interface 108.

At step S614, a combined matrix transform is formed by convolving the transforms retrieved at steps S608, S611 and S612. The transform is performed at step S616, and the decoded data is output at step S618. Since a panning matrix is used here, the output is of the form of decoded speaker feeds; in some cases, the output from the transform engine 104 is an encoded spatial audio stream, which is subsequently decoded.

It will be appreciated that similar steps will be performed by the transform engine 104, where it is used as part of a recording system. In this case, the spatial transforms are typically all specified by the user; the user also typically selects the input and output format, though the transform engine 104 may determine the transform or transforms required to convert between the user specified formats.

Regarding steps S606 to S612, in which transforms are selected for combining into a combined transform at step S614, in some cases there may be more than one transform or combination of transforms stored in the transform database 106 which enable the required data conversion. For example, if a user or software component specifies a conversion of an incoming B-Format audio stream into Surround 7.1 format, there may be many combinations of transforms stored in the transform database 106 that can be used to perform this conversion. The transform database 106 may store an indication of the formats between which each of the domain transforms converts, allowing the transform engine 106 to ascertain multiple "routes" from a first format to a second format.

In some embodiments, on receipt of a request for a given e.g. format conversion, the transform engine 104 searches the transform database 106 for candidate combinations (i.e. chains) of transforms for performing the requested conversion. The transforms stored in the transform database 106 may be tagged or otherwise associated with information indicative of the function of each transform, for example the formats to and from which a given format transform converts; this information can be used by the transform engine 104 to find suitable combinations of transforms for the requested conversion. In some embodiments, the transform engine 104 generates a list of candidate transform combinations for user selection, and provides the generated list to the user interface 106. In some embodiments, the transform engine 106 performs an analysis of the candidate transform combinations, as is now described.

Transforms stored in the database 104 may be tagged or otherwise associated with ranking values, each of which indicates a preference for using a particular transform. The ranking values may be assigned on the basis of, for example, how much information loss is associated with a given transform (for example, a B-Format to Mono conversion has a high information loss) and/or an indication of a user preference for the transform. In some cases, each of the transforms may be assigned a single value indicative of an overall desirability of using the transform. In some cases the user can alter the ranking values using the user interface 108.

On receipt of a request for a given e.g. format conversion, the transform engine 104 may search the database 106 for candidate transform combinations suitable for the requested conversion, as described above. Once a list of candidate transform combinations has been obtained, the transform engine 104 may analyse the list on the basis of the ranking values mentioned above. For example, if the parameter values are arranged such that a high value indicates a low preference for using a given transform, the sum of the values included in each combination may be calculated, and the combination with the lowest value selected. In some cases, combinations involving more than a given number of transforms are discarded.

In some embodiments, the selection of a transform combination is performed by the transform engine 104. In other embodiments, the transform engine 104 orders the list of candidate transforms according to the above-described analysis and sends this ordered list to the user interface 108 for user selection.

Thus, in an example of a transform combination selection, a user selects, using a menu on the user interface 108, a given input format (e.g. B-Format), and a desired output format (e.g. Surround 7.1), having a predefined speaker layout. In response to this selection, the transform engine 104 then searches the transform database 106 for transform combinations for converting from B-Format to Surround 7.1, orders the results according to the ranking values described above, and presents an accordingly ordered list to the user for selection. Once the user makes his or her selection, the transforms of the selected transform combination are combined into a single transform as described above, for processing the audio stream input audio stream.

The above embodiments are to be understood as illustrative examples of the invention. Further embodiments of the invention are envisaged. It should be noted that the above described techniques are not dependent on any particular formulation of the spherical harmonics; the same results can be achieved by using any other formulation of the spherical harmonics or linear combinations of spherical harmonic components, for example. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing a spatial audio signal, the method comprising:

receiving the spatial audio signal, the spatial audio signal using a spherical harmonic representation to represent one or more sound components from one or more respective sound sources, the sound components having defined direction characteristics and one or more sound characteristics, wherein each of the one or more sound characteristics is different than the defined direction characteristics and is representable by a mono signal;

providing a transform, the transform being for modifying the one or more sound characteristics of the one or more sound components in dependence on one or more defined direction characteristics of the one or more sound components;

applying the transform to the spatial audio signal, thereby generating a modified spatial audio signal, the modified spatial audio signal using a modified spherical harmonic representation to represent one or more modified sound components from the respective sound sources, wherein the one or more of the sound characteristics of a given sound component from a given sound source of the one or more respective sound sources are modified dependent on the defined direction characteristics of the given sound component; and outputting the modified spatial audio signal.

2. The method of claim 1, in which the received spatial audio signal comprises an ambisonic signal and the output spatial audio signal comprise an ambisonic signal.

3. The method of claim 1, wherein the one or more sound characteristics comprises one or more of a frequency, a volume, a pitch and a brightness.

4. A gaming system, the gaming system comprising:

a first hardware component configured to control a user-interactive gaming environment, and a second hardware component configured to process a spatial audio signal associated with the gaming environment, the second hardware component being configured to:

receive an input from the first hardware component, the input being indicative of a change in the gaming environment, and, responsive to receipt of the signal:

receive a spatial audio signal, the spatial audio signal using a spherical harmonic representation to represent one or more sound components from one or more respective sound sources, the sound components having defined direction characteristics and one or more sound characteristics, wherein each of the one or more sound characteristics is different than the defined direction characteristics and is representable by a mono signal;

provide a transform, the transform being for modifying the one or more sound characteristics of the one or more sound components in dependence on one or more defined direction characteristics of the one or more sound components;

apply the transform to the spatial audio signal, thereby generating a modified spatial audio signal, the modified spatial audio signal using a modified spherical harmonic representation to represent one or more modified sound components from the respective sound sources, wherein one or more of the sound characteristics of a given sound component from a given sound source of the one or more respective sound sources are modified dependent on the defined direction characteristics of the given sound component; and output the modified spatial audio signal.

5. The gaming system of claim 4, wherein the input comprises data indicative of a change in a characteristic of the gaming environment, and the provision of a transform comprises selecting the transform on the basis of the change in characteristic.

6. A system for processing a spatial audio signal, the system comprising:

an input configured to receive a spatial audio signal, the spatial audio signal using a spherical harmonic representation to represent one or more sound components from one or more respective sound sources, the sound components having defined direction characteristics and one or more sound characteristics, wherein each of the one or more sound characteristics is different than the defined direction characteristics and is representable by a mono signal;

a hardware processing component configured to:

provide a transform, the transform being for modifying the one or more sound characteristics of the one or more sound components in dependence on one or more defined direction characteristics of the one or more sound components; and apply the transform to the spatial audio signal, thereby generating a modified spatial audio signal, the modified spatial audio signal using a modified spherical harmonic representation to represent one or more modified sound components from the respective sound sources wherein the one or more of the sound characteristics of a given sound component from a given sound source of the one or more respective sound sources are modified dependent on the defined direction characteristics of the given sound component; and output the modified spatial audio signal.

7. A non-transitory computer-readable storage medium having computer readable instructions stored thereon, the computer readable instructions being executable by a computerized device to cause the computerized device to perform a method for processing a spatial audio signal, the method comprising:

receiving the spatial audio signal, the spatial audio signal using a spherical harmonic representation to represent one or more sound components from one or more respective sound sources, the sound components having defined direction characteristics and one or more sound characteristics, wherein each of the one or more sound characteristics is different than the defined direction characteristics and is representable by a mono signal;

providing a transform, the transform being for modifying the one or more sound characteristics of the one more sound components in dependence on one or more defined direction characteristics of the one or more sound components;

applying the transform to the spatial audio signal, thereby generating a modified spatial audio signal, the modified spatial audio signal using a modified spherical harmonic representation to represent one or more modified sound components from the respective sound sources, wherein the one or more of the sound characteristics of a given sound component from a given sound source of the one or more respective sound sources are modified dependent on the defined direction characteristics of the given sound component; and outputting the modified spatial audio signal.

8. The non-transitory computer-readable storage medium of claim 7, wherein the transform comprises a convolution.

9. The non-transitory computer-readable storage medium of claim 8, wherein the transform comprises a Finite Impulse Response (FIR) convolution.

10. The non-transitory computer-readable storage medium of claim 8, wherein the transform relates to reverb.

11. The non-transitory computer-readable storage medium of claim 7, wherein the one or more modified sound characteristics comprise a gain characteristic.

12. The non-transitory computer-readable storage medium of claim 7, wherein the one or more modified sound characteristics comprise a frequency characteristic.

13. The non-transitory computer-readable storage medium of claim 7, wherein the transform is performed in the time domain.

14. The non-transitory computer-readable storage medium of claim 7, wherein the transform is performed in the frequency domain.

15. The non-transitory computer-readable storage medium of claim 14, wherein the transform comprises a plurality of transforms each relating to a different frequency range.

16. The non-transitory computer-readable storage medium of claim 15, wherein the modification is dependent on frequency.

17. The non-transitory computer-readable storage medium of claim 7, wherein the transform results in equalisation of a sound field in a defined angular range.

18. The non-transitory computer-readable storage medium of claim 8, wherein the transform is based on a Head Related Transfer Function (HRTF), and the application of the transform comprises adding a cue to the spatial audio signal indicative of the direction characteristic of the sound component.

19. The non-transitory computer-readable storage medium of claim 18, wherein the cue is based on an Interaural Time Difference (ITD).

20. The non-transitory computer-readable storage medium of claim 18, wherein the cue is based on an Interaural Intensity Difference (IID).

21. The non-transitory computer-readable storage medium of claim 7, wherein the received spatial audio signal represents a first sound component of the sound components and a second sound component of the sound components, and the modification comprises extracting the first sound component from the spatial audio signal and maintaining the second sound component, such that the modified spatial audio signal comprises the second sound component.

22. The non-transitory computer-readable storage medium of claim 21, wherein the method further comprises:

altering a defined direction characteristic associated with the extracted first component; and introducing the altered first component into the modified spatial audio signal to provide a further modified spatial audio signal comprising the altered first component and the second component.

23. A non-transitory computer-readable storage medium comprising a non-transitory computer-readable storage medium having computer readable instructions stored thereon, the computer readable instructions being executable by a computerized device to cause the computerized device to perform a method for processing a spatial audio signal, the method comprising:

receiving the spatial audio signal, the spatial audio signal using a spherical harmonic representation to represent one or more sound components each having respective defined direction characteristics and one or more sound characteristics, wherein each of the one or more sound characteristics is different than the respective defined direction characteristics, wherein a first sound component of the one or more sound components has a first direction characteristic defining a first direction of the first sound component and one or more first sound characteristics defining one or more characteristics of the first sound component;

providing a transform, the transform being for modifying the one or more sound characteristics of the one or more sound components in dependence on one or more defined direction characteristics of the one or more sound components;

applying the transform to the spatial audio signal, thereby generating a modified spatial audio signal, the modified spatial audio signal using a modified spherical harmonic representation to represent one or more modified sound components, wherein the first sound component is modified to a modified first sound component, the modified first sound component having the first direction characteristic defining the first direction and one or more of modified sound characteristics defining one or more modified characteristics of the modified first sound component; and outputting the modified spatial audio signal.

* * * * *